United States Patent [19]

Wruck et al.

[11] Patent Number: 4,702,421
[45] Date of Patent: Oct. 27, 1987

[54] PROCESS FOR CONVEYING RAW COAL

[75] Inventors: Paul D. Wruck; Adrian J. Ryan, both of Queensland, Australia

[73] Assignee: Marathon Oil Company, Findlay, Ohio

[21] Appl. No.: 865,227

[22] Filed: May 19, 1986

[51] Int. Cl.$^4$ .......................... B02C 23/18; C10L 1/32
[52] U.S. Cl. ........................................ 241/15; 241/20; 241/21; 241/24; 44/51
[58] Field of Search .......................... 209/3, 5, 11, 172; 241/15, 20, 21, 24; 44/51

[56] References Cited

U.S. PATENT DOCUMENTS

| | | | |
|---|---|---|---|
| 3,719,397 | 3/1973 | Wasp | 302/66 |
| 4,178,233 | 12/1979 | Smith et al. | 209/3 |
| 4,263,927 | 4/1981 | Wilski et al. | 137/13 |
| 4,265,737 | 5/1981 | Smith et al. | 209/3 |
| 4,356,078 | 10/1982 | Heavin et al. | 208/8 LE |
| 4,522,628 | 6/1985 | Savins | 209/3 X |
| 4,525,173 | 6/1985 | Baker et al. | 44/51 |
| 4,613,084 | 9/1986 | Takamoto et al. | 44/51 |

*Primary Examiner*—Timothy V. Eley
*Attorney, Agent, or Firm*—Jack L. Hummel; Rodney F. Brown

[57] ABSTRACT

A process for conveying a raw coal as a slurry via a pipeline. High ash content material is dissociated from the raw coal during preparation and pipelining of the coal which enhances the rheology of the slurry. As a result, coarse run-of-mine coal can be transported as a slurry directly to a remote location with little or no pretreatment.

26 Claims, 1 Drawing Figure

PROCESS FOR CONVEYING RAW COAL

BACKGROUND OF THE INVENTION

1. Technical Field

The invention relates to a process for conveying a raw coal in a pipeline and more particularly to a process for conveying a coarse raw coal as a slurry in a pipeline while simultaneously cleaning the coal.

2. Related Art

Coal can be conveyed in a slurry form through a pipeline from a mining site to a remote location. Coal slurrying requires substantial processing of the coal at the mine site including crushing, washing, and blending. Thereafter, the slurry is prepared and conveyed to the remote site via the pipeline. Additional processing is required at the pipeline outlet to separate the coal from the slurry vehicle before the coal can be applied to its end use.

U.S. Pat. No. 3,719,397 to Wasp discloses a process for conveying coal as a slurry via a pipeline to a remote site where the coal is recovered from the slurry. The slurry vehicle is then recycled to the pipeline inlet. The process requires washing and crushing the coal at the pipeline inlet which have attendant operating and equipment costs. Furthermore, the process requires large volumes of water which may not always be available at an arid location.

U.S. Pat. Nos. 4,178,233 and 4,265,737 to Smith et al use a fluorochlorocarbon to separate foreign material from coal. The fluorochlorocarbon is then employed as a slurry vehicle to convey the coal to a remote location where the coal is separated from the vehicle for its end use. The process requires considerable preparation of the coal before transport and high material costs for the vehicle.

A process is needed for conveying coal as a slurry via a pipeline which minimizes the necessary preparation of the coal at the pipeline inlet and in turn minimizes the equipment and vehicle costs. Further, a process is needed which delivers a slurry, containing a uniform coal readily separable from the slurry, to the remote pipeline outlet.

SUMMARY OF THE INVENTION

The present invention relates to a process for conveying a raw coal containing high ash content material from a mine site to a remote location via a pipeline. The coal is conveyed as a slurry while it is simultaneously being cleaned to a reduced ash content. The process is described in general terms below.

Raw run-of-mine coal is mined and crushed on site to a coarse particle size distribution. The coarse raw coal is partitioned to a vessel where the coal slurry is prepared by mixing the raw coal feed with water. The raw coal is neither washed nor otherwise cleaned prior to slurrying. As a result, at least a portion of the high ash content material inherent in the coal attrites into the water during slurry preparation. Thus, the slurry vehicle is comprised of water and fine particles attrited from the coal. The fine particles are advantageously predominantly high ash content particles, including clay particles, although a small amount of fine coal particles may also attrite from the coal. The fine particles are uniformly dispersed in the water.

The fine particles attrited to the vehicle during slurry preparation impart beneficial rheological properties to the vehicle. Additional high ash content material, continuously attriting into the vehicle throughout conveyance of the slurry, further enhances the rheology of the vehicle. In sum, a slurry having optimum flow properties for pipeline conveyance can be prepared by controlling the composition of the vehicle as well as the particle size of the coal in the slurry and the relative proportion of coal to vehicle in the slurry.

After preparation, the slurry is fed to the pipeline inlet and pumped at a specified discharge pressure. The pipeline links the mine site with the remote location and may have a number of booster pumps at intervals along the pipeline to convey the slurry to the remote location. The pipeline operates in a turbulent flow regime which provides remix forces to the slurry. The turbulent flow and specific vehicle properties of the slurry also contribute to its stable nonsettling homogeneous character which is advantageous for shutdown or restart of the pipeline.

At the remote location, the pipeline outlet feeds the slurry to a coal separation unit for ready removal of the coarse coal from the slurry. The coal recovered from the separation unit is stored for an end use or further treatment. The vehicle, which contains the suspended clay and other high ash content particles, is discharged from the coal separator to a clariflocculator where the particles are recovered and disposed as tailings. The remaining clear water from the clariflocculator is returned to the separation unit for use therein.

The present invention provides a number of advantages over known coal conveyance processes. The vehicle of the present process has buoyancy and yield strength properties necessary to produce a homogeneous, stable, nonsettling slurry, which adequately supports the coarse coal particles throughout their route in the pipeline and even prevents plugging during shutdown and restart. The present vehicle has a higher density and better rheology than vehicles consisting of coal fines and water, thus enabling the use of less material in the vehicle for an equivalent level of support. The homogeneity of the slurry lowers the pressure drop of the coarse coal slurry as it flows through the pipeline.

Another advantage of the present process is that it integrates cleaning with conveyance of the coal. Heretofore, run-of-mine coals have generally been cleaned before slurrying because clay has been considered an undesirable material in downstream processing of the coal. However, in the present process the coarse coal is not pretreated before slurrying because the coal can be simultaneously cleaned and conveyed. Fine particles having a high ash content are dislodged from the coarse coal during preparation and conveyance of the slurry. The particles are beneficially suspended in the flowing vehicle enhancing the rheology thereof. Thereafter, the coarse coal particles are recovered at the pipeline terminal. The delivered coal has a substantially lower ash content than the coal entering the pipeline.

Slurrying a coarse coal rather than a fine coal reduces process equipment needs considerably at both ends of the pipeline. Processing at the inlet of the pipeline is advantageously limited to crushing the coal and mixing it into a slurry. At the pipeline outlet, a conventional coal is delivered with respect to size, moisture content and handleability, which is recovered relatively easily from the vehicle by size separation.

DESCRIPTION OF PREFERRED EMBODIMENT

Figure 1:
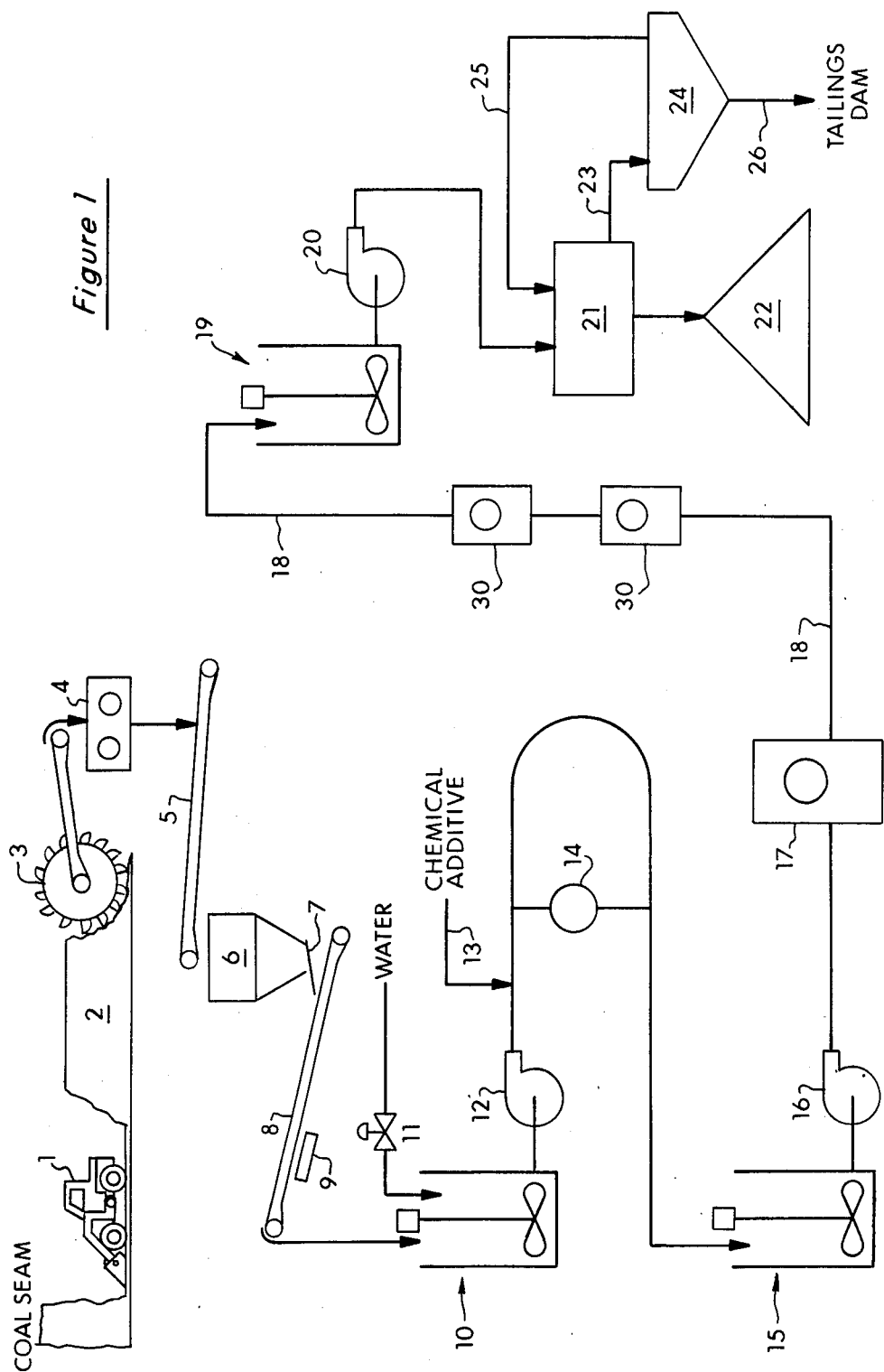
FIG. 1 is a schematic flow sheet of the coal conveyance process.

An embodiment of the process is described below with reference to FIG. 1. A raw run-of-mine coal is mined from a coal seam by conventional mining equipment 1. As defined herein, the term "run-of-mine coal" refers to a typical coal from the mine having no outstanding qualities and the term "raw coal" refers to a coal which has not been treated by washing to substantially reduce its ash content.

Raw run-of-mine coal particularly advantageous to the process of the present invention is a coal containing soft readily-dispersible clay and other fine high ash content material. "Ash" as defined herein is materials which are not combustible at coal incineration temperatures and is inclusive of clays and other mineral residue. The coal preferably contains approximately about 10 to about 40% ash by weight, more preferably about 15 to about 30% ash by weight and most preferably about 20 to about 25% ash by weight. The coal advantageously does not contain significant quantities of coal fines nor does it readily create significant quantities of coal fines during handling and pipelining. Fines or fine particles are defined as particles less than 0.6 mm in size.

The raw run-of-mine coal is delivered from the mine to blending stockpile 2 where the fine ash content of the raw coal is controlled before slurrying. The coal is recovered from the blending stockpile by bucket wheel reclaimer 3 and transferred to coal roll crusher 4. The coal is crushed to a coarse top size, e.g., about 20 mm, and discharged onto conveyor 5 which feeds into slurry preparation feed silo 6.

The crushed run-of-mine coal is discharged by feeder 7 from feed silo 6 and delivered by conveyor 8 into slurry preparation mixer 10 at a rate controlled by weightometer 9. Water is added to slurry preparation mixer through control valve 11 in predetermined amounts proportional to the coal feed. The slurry preparation mixer is specifically designed to disperse the fine clay particles and other fine ash particles in the water with the coal to meet preselected slurry properties.

The resulting slurry is pumped by pump 12 through a test pipe loop 14 which enables control of the slurry properties to within predetermined specifications. Chemical additives may be added to the slurry through pipe 13 to additionally control the slurry properties. Chemical additives include materials which reduce the electrostatic attraction between particles in the slurry. Such beneficial additives include hydroxide and/or phosphate ions. Preferred sources of phosphate ions include orthophosphates and higher phosphates. Most preferred is the higher phosphate, $Na_5P_3O_{10}$, i.e., sodium tripolyphosphate (STPP).

Pipe loop 14 discharges the slurry into agitated storage tank 15 for storage of the slurry prior to feeding it into pipeline 18. When it is desired to feed the slurry into pipeline 18 it is pumped from agitated storage tank 15 by means of pump 16 and transferred into lockhopper type pumps 17 which create the necessary discharge pressure for transporting the slurry through pipeline 18. A number of lockhopper type booster pumps 30 similar to pumps 17 may be installed at intervals along the pipeline to assist in conveyance of the slurry, especially for long distance pipelines.

Upon arrival at the pipeline terminal, the slurry is discharged into agitated storage tank 19. The coal is pumped from storage tank 19 by pump 20 into a coal separation process facility 21 where the coal is separated from the slurry and placed in storage pile 22. The vehicle portion of the slurry, i.e., water and high ash content particles, is discharged via pipe 23 into clariflocculator 24. The fine high ash content particles are recovered in clariflocculator 24 and a clear water overflow 25 is returned to the coal separation process facility to dilute the slurry before separation. The underflow from the clariflocculator is pumped by pipeline 26 for disposal in a tailings dam.

A number of slurry parameters determine the rheological properties of the prepared slurry. Slurry parameters include the coal particle size distribution, the solids content and density of the vehicle and the total solids content of the slurry. Ranges of values for these parameters which are within the scope of the present invention are described below. Values of the parameters within the prescribed ranges are preselected to provide a slurry, having rheological properties including vehicle viscosity and yield stress, capable of meeting the performance requirements of a given pipelining system.

The top size of the coal particles is limited by head loss constraints in the pipeline. As a rule, the larger the top size of the coal particles, the greater the head loss, which can be an important consideration in long pipelines. On the other hand, consumers of the coal slurry product prefer coal particles having a larger top size because they are more conventional. Balancing these considerations, a maximum top size according to the present process is about 50 mm while a preferred maximum top size is about 25 mm. If the top size is less than 10 mm, an unacceptable large quantity of coal fines is likely to be produced during crushing of the coal.

The solids content of the vehicle is about 20 to 37% by weight, preferably about 24 to 33% by weight and most preferably about 28 to 32% by weight. The vehicle density is about 1.12 to 1.25 $g/cm^3$, preferably about 1.15 to 1.22 $g/cm^3$ and most preferably about 1.18 to 1.21 $g/cm^3$. As a rule, the higher the density the more effectively the vehicle is able to support the coarse coal particles. However, high densities undesirably increase the yield stress and viscosity of the vehicle. Selection of a vehicle density is a balancing of these considerations.

The slurry can be characterized by weight percent of total solids in the slurry, including the coarse coal particles, and the coal and ash fines in the vehicle. The slurry may have a total solids concentration of about 42 to about 65% by weight, preferably about 48 to about 62% by weight and most preferably about 54 to about 60% by weight.

As noted above, the plastic viscosity of the vehicle increases with increasing vehicle density. Thus, selection of values for these parameters is a trade-off. The plastic viscosity of the vehicle should not exceed 30 mPa·s, preferably 15 mPa·s and most preferably 9 mPa·s. The yield stress of the vehicle should exceed a minimum value to support coarse particles when the pipeline is stopped. This value depends on the maximum size of the particle and the difference between the density of the coarse coal and the vehicle. For a coal having a 25 mm top size, the minimum yield stress is 2 Pa. For a coal having a 50 mm top size, the minimum yield stress is 4 Pa. On the other end of the range, the vehicle stress cannot be too high or head losses will increase to an unacceptable level. The maximum yield stress is about 20 Pa, preferably about 10 Pa and most preferably about 4 Pa for a coal having a 25 mm top size. A chemical additive may be used to control yield stress.

The following example demonstrates an embodiment of the present invention wherein slurry properties are preselected to obtain a slurry having desired rheological properties. The example is not to be construed as limiting the scope of the invention.

EXAMPLE

A coal having an ash content of 31% by weight is mined and crushed to a particle size distribution of 20×0 mm. The coal is slurried with water in a mixer. The resulting vehicle has a density of 1.189 g/cm$^3$, a plastic viscosity of 9 mPa·s and a solids content of 29.6% by weight. The residence time of the slurry in the mixer is about 1 hour. The total solids content of the slurry is about 60% by weight. Sodium tripolyphosphate (STPP) is added to the slurry at a rate of 0.175 metric tons/hour to reduce the yield stress by a factor of 6. The slurry is pumped into the inlet of a 0.55 meter outside diameter pipeline at a rate of 7.75 million metric tons per year. The pipeline is about 200 km long. The pressure gradient in the pipeline is about 215 kPa/km.

The slurry is conveyed the length of the pipeline while additional water and STPP are added to the slurry at four pump stations spaced along the route to compensate for ash and coal attrition that takes place in the pipeline. In total, 259 metric tons/hour of water and 0.237 metric tons/hour of STPP are added to the slurry en route.

The final solids content of the slurry at the pipeline outlet is about 52% by weight. The pressure is about 220 kPa/km. The vehicle has a density of about 1.171 g/cm$^3$, a plastic viscosity of about 9 mPa·s and a solids concentration of about 29.1% by weight. The overall increases in vehicle properties is caused by the attrition of high ash material and some fine coal from the coarse coal into the vehicle. The coal is recovered from the slurry at the pipeline terminal and prepared for its end use. The ash content of the coal at the pipeline terminal is about 12% by weight. The coal particle size distribution at the pipeline inlet and outlet is shown below:

|  | Cumulative Percent Retained | |
|---|---|---|
| Size | Run-of-Mine Coal | Product Coal |
| 20 mm | 3 | 5 |
| 10 mm | 23 | 30 |
| 5 mm | 51 | 60 |
| 2 mm | 63 | 85 |
| 0.6 mm | 73 | 100 |

While the foregoing embodiments of the invention have been described and shown, it is understood that the alternatives and modifications, such as those suggested and others, may be made thereto and fall within the scope of the invention.

We claim:

1. A process for conveying an unwashed raw coal containing a high ash content material via a pipeline having an inlet and an outlet comprising the steps of:
   (a) crushing said raw coal to a coarse size distribution having a top size of at least about 10 mm; (b) admixing said raw coal and water in a proportion sufficient to form a stable slurry having preselected rheological properties wherein said slurry consists essentially of said coal and a vehicle made up of water and a portion of said high ash content material dissociated from said coal during steps (a), (b), and a step of flowing said slurry via said pipeline;
   (c) flowing said slurry from said pipeline inlet to said pipeline outlet at a remote location via said pipeline under turbulent conditions to dissociate said portion of said high ash content material from said coal into said vehicle which enhances said preselected rheological properties of said slurry and substantially reduces the amount of high ash content material contained in said coal at said pipeline outlet relative to said pipeline inlet; and
   (d) separating said coal containing said substantially reduced amount of high ash content material from said vehicle at said remote location.

2. The process of claim 1 wherein said raw coal has an ash content of about 20 to about 40% by weight before crushing and said coal has an ash content at said pipeline outlet of about 8 to about 14% by weight.

3. The process of claim 1 wherein said coarse size distribution of said coal is about 50×0 mm to about 10×0 mm.

4. The process of claim 1 wherein the density of said vehicle is about 1.10 to about 1.26 g/cm$^3$.

5. The process of claim 1 wherein the plastic viscosity of said vehicle is about 5 to about 20 mPa·s.

6. The process of claim 1 wherein the solids concentration of said vehicle is about 20 to about 37% by weight.

7. The process of claim 1 wherein the yield stress of said vehicle is about 1 to about 6 Pa.

8. The process of claim 1 wherein the total solids concentration of said slurry is about 48 to about 65% by weight.

9. The process of claim 1 wherein said slurry is flowed by pumping at one or more intervals along said pipeline.

10. The process of claim 1 wherein said coal is separated from said vehicle by means of one or more dewatering screens.

11. The process of claim 1 wherein said water is separated from said high ash content material after said coal is separated from said vehicle.

12. The process of claim 1 wherein said pipeline inlet is at a mining site of said coal.

13. A process for conveying an unwashed raw coal containing a high ash content material via a pipeline having an inlet and an outlet comprising the steps of:
   (a) crushing said raw coal to a coarse size distribution having a top size of at least about 10 mm;
   (b) admixing said raw coal, an additive, and water in a proportion sufficient to form a stable slurry having preselected rheological properties wherein said slurry consists essentially of said coal and a vehicle made up of water, said additive which enhances said rheological properties, and a portion of said high ash content material dissociated from said coal during steps (a), (b), and a step of flowing said slurry via said pipeline;
   (c) flowing said slurry from said pipeline inlet to said pipeline outlet at a remote location via said pipeline under turbulent conditions to dissociate said portion of said high ash material from said coal into said vehicle which enhances said preselected rheological properties of said slurry and substantially reduces the amount of high ash content material contained in said coal at said pipeline outlet relative to said pipeline inlet; and (d) separating said coal containing said substantially reduced amount of high ash content material from said vehicle at said remote location.

14. The process of claim 13 wherein said preselected rheological properties include plastic viscosity and the yield stress of said vehicle.

15. The process of claim 14 wherein the plastic viscosity of said vehicle is about 5 to about 20 mPa·s.

16. The process of claim 14 wherein the yield stress of said vehicle is about 1 to about 6 Pa.

17. The process of claim 13 wherein said raw coal has an ash content of about 20 to about 40% by weight before crushing and said coal has an ash content at said pipeline outlet of about 8 to about 14% by weight.

18. The process of claim 13 wherein the density of said vehicle is about 1.10 to about 1.26 g/cm$^3$.

19. The process of claim 13 wherein the solids concentration of said vehicle is about 20 to about 37% by weight.

20. The process of claim 13 wherein the total solids concentration of said slurry is about 48 to about 65% by weight.

21. The process of claim 13 further comprising admixing said additive to said slurry while flowing said slurry via said pipeline to enhance said preselected rheological properties.

22. The process of claim 13 wherein said additive is admixed to said slurry in a concentration up to about 0.40% by weight based on the total solids of said slurry.

23. The process of claim 13 wherein said additive is sodium tripolyphosphate.

24. The process of claim 13 further comprising separating said water from said high ash content material after said coal is separated from said vehicle.

25. The process of claim 13 wherein said coarse size distribution of said coal is about 50×0 mm to about 10×0 mm.

26. The process of claim 13 wherein said additive comprises hydroxide or phosphate ions.

* * * * *

UNITED STATES PATENT AND TRADEMARK OFFICE
CERTIFICATE OF CORRECTION

PATENT NO. : 4,702,421

DATED : October 27, 1987

INVENTOR(S) : Paul D. Wruck et al

It is certified that error appears in the above-identified patent and that said Letters Patent is hereby corrected as shown below:

Col. 3, line 37: After "crushed" insert --raw--.
Col. 4, line 35: Delete "unacceptable" and insert --unacceptably--.
Col. 4, line 66: After "vehicle" insert --yield--.
Col. 5, line 37: Delete "increases" and insert --increase--.
Col. 6, line 63: After "ash" insert --content--.

Signed and Sealed this

Twelfth Day of July, 1988

Attest:

DONALD J. QUIGG

*Attesting Officer*　　　　*Commissioner of Patents and Trademarks*